April 1, 1924.  S. TRACHTENBERG  1,488,955

COMB

Filed Nov. 15, 1923.

INVENTOR.
Samuel Trachtenberg
BY John A. Bommhardt
ATTORNEY.

Patented Apr. 1, 1924.

1,488,955

UNITED STATES PATENT OFFICE.

SAMUEL TRACHTENBERG, OF CLEVELAND, OHIO.

COMB.

Application filed November 15, 1923. Serial No. 674,917.

*To all whom it may concern:*

Be it known that I, SAMUEL TRACHTENBERG, a citizen of the United States, residing at Cleveland, in the county of Cuyahoga and State of Ohio, have invented certain new and useful Improvements in Combs, of which the following is a specification.

This invention relates to improvements in combs, having for an object to provide means whereby an insert such as a mirror may be removably and securely carried by a comb.

Another object is to provide a comb with an extension or an open frame in which a mirror is removably arranged and in which the opening is so formed as to expand slightly with insertion of the mirror thereby preventing breaking of the mirror glass and at the same time snugly grip the edges of the mirror or its frame.

Other objects will be in part obvious and in part pointed out hereinafter.

In order that the invention and its mode of operation may be readily understood by persons skilled in the art, I have in the accompanying illustrative drawings, and in the following detailed description based thereon set out one possible embodiment of the same.

Figure 1:
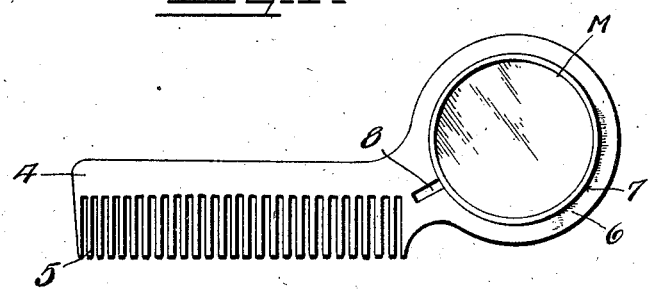

In these drawings:

Fig. 1 is a side elevation of the comb including my improvements.

Figure 2:
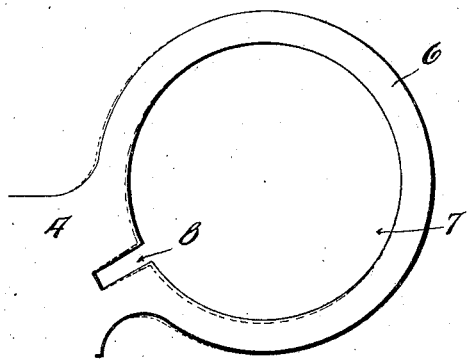
Figure 3:
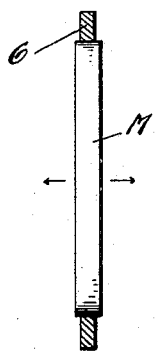

Fig. 2. is an enlarged elevation showing in dotted lines the manner in which the open frame expands with insertion of the mirror, and Fig. 3. is a vertical transverse section of the mirror frame and the mirror arranged therein.

Having more particular reference to the drawings throughout which similar characters of reference designate similar parts, this improved comb may be stated as comprising a comb body portion 4 having upon one edge a set of teeth 5 which are formed in the usual manner. In the accompanying drawings, I have illustrated a mirror M supporting or carrying frame 6 as being formed adjacent one end of the comb body, but it is to be understood that this frame may be arranged as an extension at one end of the comb or formed integrally with the comb back or body portion at any desired point. In my co-pending application Serial Number 665,381 filed September 28, 1923, another arrangement of the mirror supporting frame is shown; this form being dependent upon a particular formation of the wall of the opening to retain a mirror therein.

It has been found that where a plain opening is provided in the extension to receive a mirror, the mirror will almost invariably become loose and drop out of the opening, or should the opening be of a size to snugly retain the mirror therein breakage is quite probable when inserting the mirror.

In order to overcome this objectionable feature I have provided the opening 7 in which the mirror M is inserted, with one or more radial notches or recesses 8 whose function is to allow a slight expansion of the frame upon insertion of the mirror. It is quite apparent and is illustrated in Figure 2 that the provision of one or more of these notches or recesses will allow for the desired amount of expansion of the opening and prevent the breaking of the mirror glass upon its being arranged in the opening.

The effect of this structure is similar to the arrangement of spring means within the opening to snugly engage the periphery of the mirror frame, which would reliably retain the mirror in its proper position.

Certain minor changes in the structure and arrangement of parts may be resorted to and such changes as fall within the scope of the appended claims I consider my invention.

I claim:

1. The combination with a comb of an open frame formed integral therewith, an insert receivable in the frame and means carried by the frame to permit yielding of the walls whereby they will snugly engage the periphery of the insert.

2. A comb having an extension provided with a transverse opening, and an insert retainable in the opening, the wall forming the opening being notched whereby to yieldably engage the wall with the edge of the insert.

3. A comb having an integral extension adjacent one end, and said extension having a transverse circular opening and a notch in the wall of the opening whereby to permit expansion of the wall upon positioning an insert in the opening and to provide a snug fit.

In testimony whereof, I affix my signature.

SAMUEL TRACHTENBERG.